Sept. 18, 1923.
P. MALASKY
1,468,120
NUT AND BOLT LOCK
Filed April 6, 1922
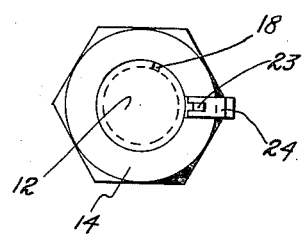
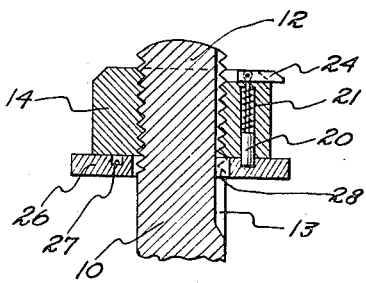
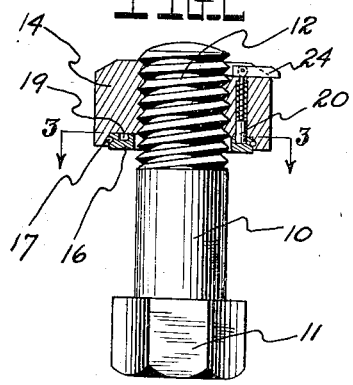
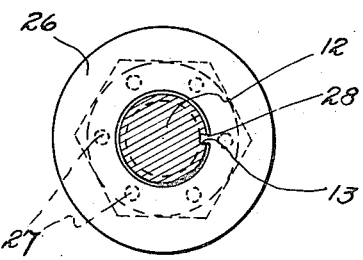
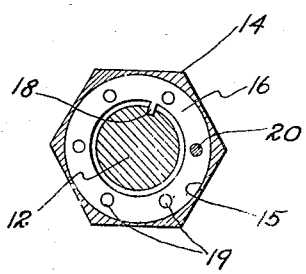
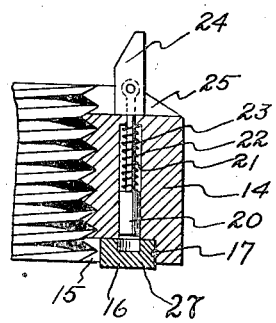
INVENTOR
P. Malasky
BY
ATTORNEY Patented Sept. 18, 1923.

1,468,120

UNITED STATES PATENT OFFICE.

PETER MALASKY, OF DETROIT, MICHIGAN, ASSIGNOR OF ONE-HALF TO LAZAR SAWULCHIK, OF DETROIT, MICHIGAN.

NUT AND BOLT LOCK.

Application filed April 6, 1922. Serial No. 549,989.

*To all whom it may concern:*

Be it known that I, PETER MALASKY, a citizen of Russia, residing at Detroit, in the county of Wayne and State of Michigan, have invented certain new and useful Improvements in Nut and Bolt Locks, of which the following is a specification.

This invention relates to improvements in devices for locking, screw-threaded elements, as nuts on their bolts, in a positive manner and has for its object the provision of means carried by the nut co-operative with means formed in the bolt.

To this purpose the improvements comprise features hereinafter described in their preferred embodiments and illustrated in the accompanying drawing, forming a material part of this disclosure, and in which:—

Figure 1 is a top plan view of a nut and bolt arranged in accordance with the invention.

Figure 2 is a side elevational view of the same, the nut and allied elements being in section.

Figure 3 is a transverse section on line 3—3 of Figure 2.

Figure 4 is a longitudinal sectional view of the nut and part of the bolt, showing a modification in construction.

Figure 5 is a bottom plan view of the same.

Figure 6 is an enlarged fragmentary view, showing a section of the nut and detent, drawn to an enlarged scale.

In the drawing, the numeral 10 designates the body of an ordinary commercial bolt having a head 11 and a screw threaded portion 12, but it is to be understood that any screw-threaded part may be substituted for the bolt illustrated, the same being provided with a shallow longitudinal slot 13 extending slightly beyond the end of the screw threads into the shank.

Engageable with the bolt is a nut 14, here shown of the size and proportion of a common standard hexagonal nut and, as indicated in Figures 2, 3 and 6, contains an annularly chambered recess 15 in its base, in which is received a flat ring 16.

Said ring is rotatably secured in the recess by a spring wire 17 set in corresponding annular grooves formed partially in the inner wall of the recess 15 and periphery of the ring 16 as indicated.

Extending integrally from the inner circumference of the ring 16 is a projection 18 adapted to engage the slot 13 in the manner of a key and in the upper surface of the ring are a plurality of evenly spaced shallow openings 19 facing the bottom of the recess 15. Engageable in any of these openings is a detent plunger 20 slidable in an opening 21 drilled lengthwise thru the nut, normally pressed down by a spring 22 encircling the stem 23, abutting the plunger and partially closed end of the opening. The plunger stem continues through and pivotally engages midway in the length of a lever 24, normally seated in a recess 25 formed transversely in the top of the nut beyond which the point of the lever slightly extends, the lever being flush or level with the upper surface of the nut when extended horizontally.

In the modification, shown in Figures 4 and 5, in place of the ring 15 being inserted in the nut, a washer 26 is used, the same having openings 27, for the plunger 20 and a key 28 engaging the slot 13 of the bolt.

In operation, the nut is screwed upon the bolt in the usual manner, the key 18 or 28 engaging the slot and hence being held from rotation and the lever being raised, withdraws the plunger from the openings 19 or 27.

From the foregoing it will be seen that simple devices for the purpose have been described and illustrated in the preferred form of their embodiments, but it is understood that minor changes in construction may be made without departing from the spirit of the invention or conflicting with its scope as defined in the claims hereto appended.

Having thus described my invention, what I claim as new and desire to secure by Letters Patent, is:—

1. A nut locking device comprising a threaded element having a longitudinal slot, a nut engageable with said element, a ring rotatably engaged in the bottom of said nut, a projection extending inward of said ring suited to engage the mentioned slot, said ring containing a plurality of uniformly spaced openings in its upper surface, said nut having an opening parallel to its threaded opening registerable with any of the other openings, resilient means for retaining said ring within the nut, a spring impelled plunger movable in the opening of said nut and selectively engageable in the openings of said ring, a lever operable in the upper portion of said nut, said lever being normally level with its upper surface, and pivotal connections between said lever and said plunger.

2. A nut lock comprising in combination with a slotted screw, a nut fitted to said screw, said nut having a radial recess in its top, a lever in the mentioned recess level with the upper surface thereof, a spring impelled plunger movable longitudinally in said nut, a pivotal connection between said plunger and lever, a washer within said nut, said washer and the recess in said nut containing semi-annular recesses, a spring locking ring in the mentioned recesses, said washer having spaced openings individually receptive of said plunger, and a projection formed on the inner circumference of said washer engageable in the slot of said screw.

In witness whereof I affix my signature.

PETER MALASKY.